Feb. 3, 1925.
W. E. DUNSTON
1,525,378
BUMPER ATTACHING AND SUPPORTING MEANS
Filed May 8, 1923
Fig.1
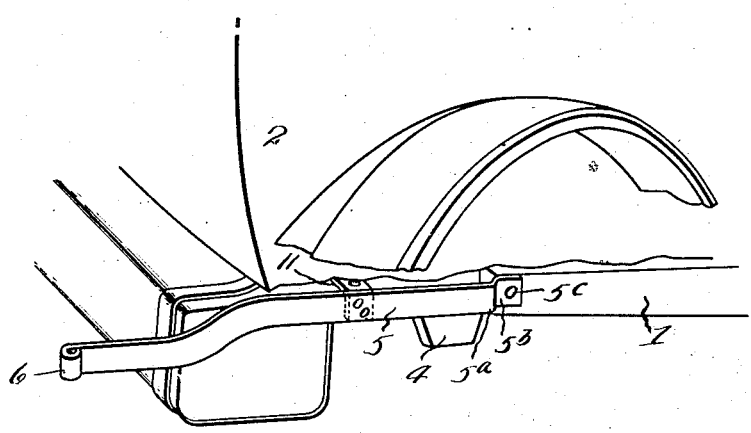
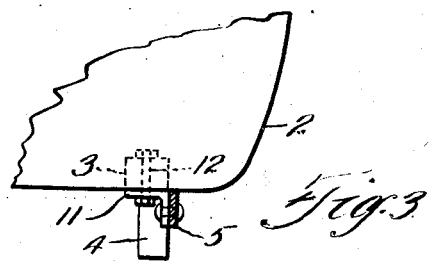
Fig.3
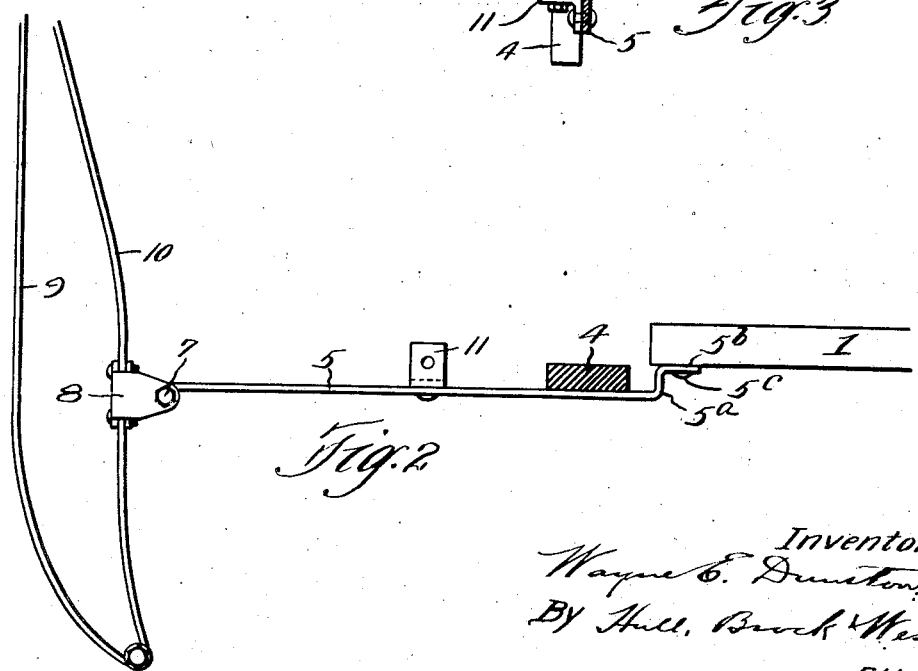
Fig.2
Inventor
Wayne E. Dunston
By Hill, Brock & West,
Attys.

Patented Feb. 3, 1925.

1,525,378

UNITED STATES PATENT OFFICE.

WAYNE E. DUNSTON, OF DETROIT, MICHIGAN, ASSIGNOR TO THE C. G. SPRING & BUMPER COMPANY, OF DETROIT, MICHIGAN, A CORPORATION OF DELAWARE.

BUMPER ATTACHING AND SUPPORTING MEANS.

Application filed May 8, 1923. Serial No. 637,465.

*To all whom it may concern:*

Be it known that I, WAYNE E. DUNSTON, a citizen of the United States, residing at Detroit, in the county of Wayne and State of Michigan, have invented a certain new and useful Improvement in Bumper Attaching and Supporting Means, of which the following is a full, clear, and exact description, reference being had to the accompanying drawings.

This invention relates to means for supporting bumpers from automobile frames, and has for its general object to provide an efficient bumper support for certain types of automobile frames, with means for connecting the said support to said frames in a convenient and efficient manner.

I accomplish the foregoing general objects in and through the construction and arrangement of parts shown in the drawings, wherein Fig. 1 represents a detail in perspective of the rear end of an automobile having my invention applied thereto; Fig. 2 a detail in plan of the vehicle frame showing my improved invention applied thereto and supporting a bumper; and Fig. 3 a sectional detail showing the manner in which the intermediate portion of the bumper supporting arm is connected to and supported from the body sill.

Describing the various parts by reference characters, 1 denotes the rear portion of one of the side frame members of an automobile, the said member terminating considerably in front of the rear of the body 2. Secured beneath the body, preferably by being anchored to the body sill 3, is a rubber buffer 4, which is adapted to engage the axle and act as a shock absorber.

In order to support the bumper from a frame-and-body-construction such as disclosed herein, I provide for each vehicle a pair of spring plate bumper supporting arms, one of said arms being indicated generally at 5. Each arm has its inner or front end deflected inwardly, as shown at 5ª, in order to clear the rubber buffer 4, the front or inner inner end 5ᵇ of such arm being secured to the rear end of its side member 1 in any convenient manner, as by means of rivets, one of which is indicated at 5ᶜ. The outer end of each arm is provided with an eye 6 adapted to receive a bolt 7 by which a clamp 8 is pivotally mounted on the end of each arm, each clamp being secured to a bumper, a portion of which is shown in Fig. 2, the bumper shown herein comprising a front impact member 9 and a rear or auxiliary member 10 to which the clamps are connected. Riveted or otherwise suitably secured to each arm 5, intermediate the ends thereof, is an angle bracket 11, the horizontal arm of such bracket extending beneath the body sill 3 on that side of the vehicle and being connected to such sill by means of one or more bolts 12.

The construction described herein enables the bumper to be conveniently applied to a vehicle body and frame such as shown herein and enables the bumper to be firmly and rigidly supported and in such condition as to enable it and its connections and supports to withstand all of the ordinary incidents of use.

Having thus described my invention, what I claim is:

1. A bumper supporting arm having its inner or attaching end offset inwardly for attachment to a side member of an automobile and having, intermediate of its ends, a lateral projection adapted to be secured to a body sill.

2. The combination, with a side frame member and the cooperating body sill of a vehicle, of a bumper supporting arm, the said arm being attached at one end to the end portion of said frame member and having a lateral or horizontal extension secured to said body sill.

3. The combination, with a side frame member and the cooperating body sill of an automobile, of a bumper supporting arm having its forward or inner end connected to said frame member and its body offset outwardly, and an inwardly extending projection carried by said arm and secured to said body sill.

4. The combination, with a side frame member and the cooperating body sill of an automobile, of a downwardly projecting axle-engaging buffer secured to said body sill and located laterally outside of the frame member, a bumper supporting arm having its forward or inner end connected to said frame member and its body offset outwardly to clear said buffer, and an inwardly extending projection carried by said arm and secured to said body sill.

In testimony whereof, I hereunto affix my signature.

WAYNE E. DUNSTON.